3,085,111
PROCESS FOR PREPARING 3-NITROBENZALDE-
HYDE ETHERS
Robert I. Meltzer, Rockaway, N.J., assignor to Warner-
Lambert Pharmaceutical Company, Morris Plains,
N.J., a corporation of Delaware
No Drawing. Original application Mar. 19, 1957, Ser.
No. 646,971, now Patent No. 2,954,399, dated Sept.
27, 1960. Divided and this application Feb. 5, 1960,
Ser. No. 6,844
1 Claim. (Cl. 260—600)

This invention relates to a new process for the preparation of thyroxine analogs.

In recent years it has been shown that a number of analogs of thyroxine possess certain valuable biological properties which, in some cases, are strikingly dissimilar to those of thyroxine. Among such thyroxine analogs are 3,3'-diiodothyronine and 3,3',5'-triiodothyronine. While possessing many properties which are generally related to those of thyroxine, these compounds are distinguished from thyroxine in that they are relatively weak metabolic stimulants. Recent trials indicate that the said compounds show considerable promise for the treatment of certain diseases which might have been successfully treated with thyroxine were it not that the patients are unable to tolerate the basal metabolic rate elevation which thyroxine would produce.

It is known that 3,3'-diiodothyronine may be obtained readily by iodination of 3-iodothyronine. It is further known that 3,3',5'-triiodothyronine may be obtained readily by iodination of 3,3'-diiodothyronine and also directly by iodination of 3-iodothyronine. However, the prior art methods of preparing 3-iodothyronine are lengthy, impractical and give low overall yields.

It is an object of this invention to provide a new, convenient and practical process for the preparation of certain important synthetic precursors of 3-iodothyronine as well as a process for the preparation of 3-iodothyronine itself. Another object of this invention is to provide new and valuable compounds which may be used as intermediates in the synthesis of 3-iodothyronine.

The present invention provides a novel approach to the synthesis of 3-iodothyronine and certain precursors thereof in accordance with the following scheme of reactions:

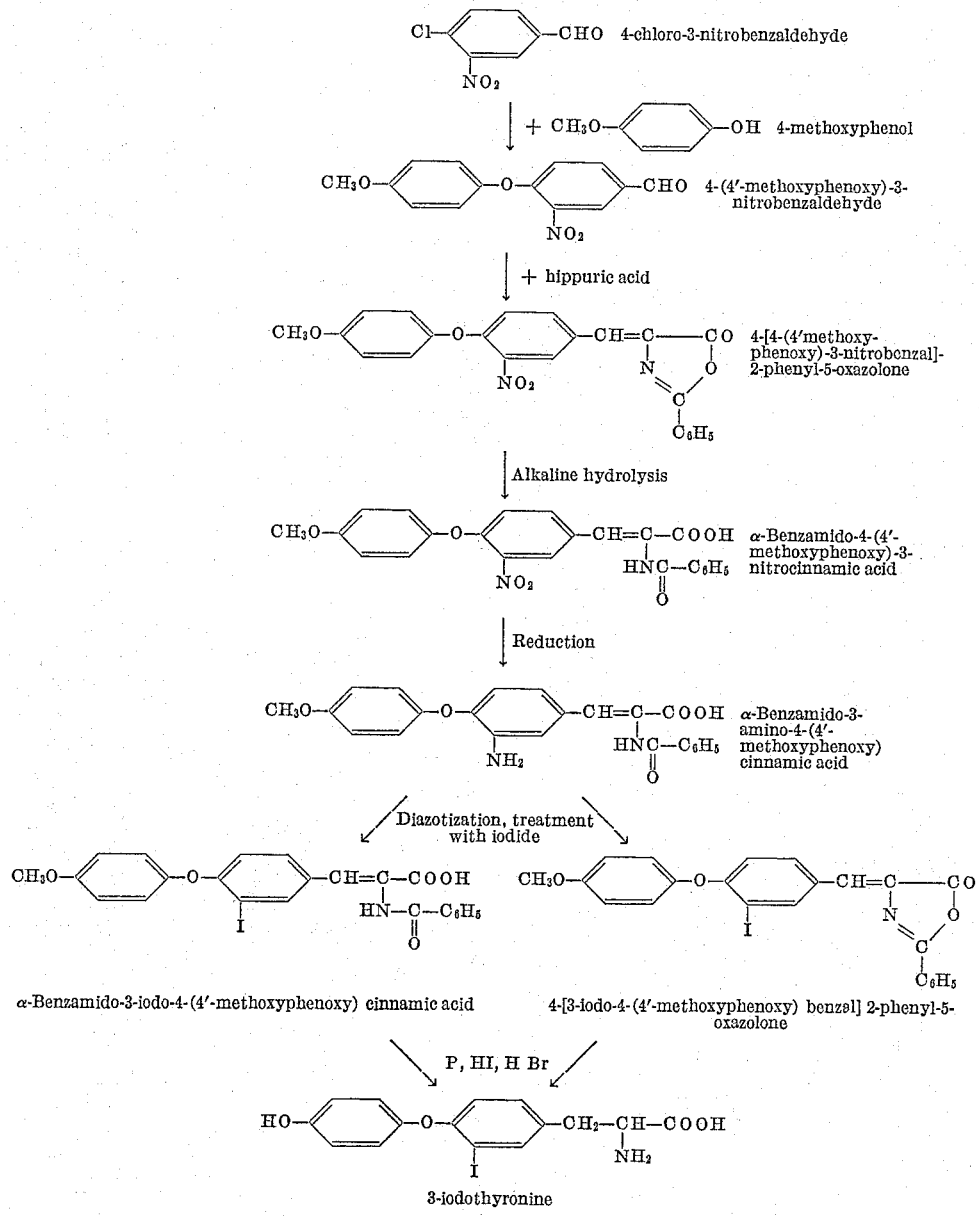

The condensation of 4-chloro-3-nitrobenzaldehyde with 4-methoxyphenol may be carried out in the presence of potassium hydroxide and pyridine over the temperature range 50–65° C. The use of pyridine as the solvent is particularly desirable inasmuch as it obviates the need of a thermally vigorous reaction; under these conditions the reaction is rapid and the crude reaction product is clean enough to be used in the following step without purification.

The reaction of 4-(4'-methoxyphenoxy)-3-nitrobenzaldehyde with hippuric acid may be carried out in the presence of freshly fused sodium acetate, acetic acid and acetic anhydride on the steam bath. The resulting oxazolone is hydrolyzed with sodium hydroxide. The use of 50% aqueous ethanol as solvent for the sodium hydroxide results in a smooth and rapid reaction. The resulting α-benzamido-4-(4'-methoxyphenoxy) - 3 - nitrocinnamic acid is then reduced to the corresponding 3-amino compound. The reduction may be performed by nascent hydrogen produced for example with powdered iron. However, catalytic hydrogenation in the presence of palladium on charcoal catalyst is preferred inasmuch as the reaction mixture is more conveniently worked up following catalytic hydrogenation; further, after reduction by the preferred procedure, the reaction mixture may be filtered to remove the catalyst, and used directly in the next reaction step without isolation of the reaction product. In this manner diazotization of the amine proceeds smoothly. The decomposition of the resulting diazonium compound is carried out with iodine and an alkali metal iodide such as sodium iodide, and preferably in the presence of urea. Further, the reaction is best conducted in a two-phase aqueous solvent system such as chloroform and water. The product of the above Sandmeyer reaction is regarded as a mixture of two substances, namely, α-benzamido-3-iodo-4-(4'-methoxyphenoxy)cinnamic acid and 4-[3-iodo-4-(4'-methoxyphenoxy)benzal]-2-phenyl-5-oxazolone inasmuch as recrystallization of the crude reaction product has yielded each of the said substances. However, each of the latter was found to be readily converted to 3-iodothyronine by hydrolysis with a mixture of red phosphorus, hydriodic acid and hydrobromic acid. Accordingly, the crude product resulting from the above Sandmeyer reaction, may be successfully used, without purification, in the hydrolysis with red phosphorus, hydriodic acid and hydrobromic acid to yield the desired 3-iodothyronine.

In the first step of the reaction scheme set forth above, the chlorine atom of 4-chloro-3-nitrobenzaldehyde may be replaced by other halogen atoms, and the methoxy group of 4-methoxyphenol may be replaced by other alkoxy groups without affecting the feasibility of the entire reaction scheme.

It will be noted that new compounds 4-(4'-methoxyphenoxy)-3-nitrobenzaldehyde, 4-[4 - (4' - methoxyphenoxy)-3-nitrobenzal]-2-phenyl-5-oxazolone, α-benzamido-4-(4'-methoxyphenoxy)-3-nitrocinnamic acid and α-benzamido-3-amino-4 - (4' - methoxyphenoxy)cinnamic acid are of value as intermediates in the synthesis of 3-iodothyronine.

EXAMPLE I

(a) 4-(4'-Methoxyphenoxy)-3-Nitrobenzaldehyde

To a solution prepared by heating 124 g. (1 mole) of 4-methoxyphenol, 44.1 g. of potassium hydroxide and 125 ml. of pyridine, was added portionwise with stirring 91.4 g. (0.49 mole) of 4-chloro-3-nitrobenzaldehyde. The temperature was maintained at 50–55° C. by gentle cooling. After the addition was complete, the reaction mixture was warmed to 65° C. for about 5 minutes, cooled and poured onto ice. The resulting oil was taken up in chloroform, washed with water, 4 N hydrochloric acid and water. The solution was dried and evaporated to dryness yielding an oil which was used directly in the next step of the reaction scheme. (If desired, the oil can be made to crystallize by cooling and scratching, and the resulting crystals are washed with n-propanol and then recrystallized from isopropanol. The pure substance melts at 57.5–58° C.)

(b) 4-[4-(4'-Methoxyphenoxy)-3-Nitrobenzal]-2-Phenyl-5-Oxazolone

To the oily product obtained as described in section (a) above, there was added 132 g. (0.74 mole) of hippuric acid, 157 g. (1.92 moles) of freshly fused sodium acetate, and 650 ml. of acetic acid. The reaction was heated on a steam bath with stirring for about 30 minutes and the resulting solution was treated with 650 ml. of acetic anhydride, whereafter heating was continued for 1 hour. The reaction mixture was then poured onto 2 liters of ice-water and the resulting precipitate was collected on a filter and dried. The product weighed 171 g. (84% yield based on 4-chloro-3-nitrobenzaldehyde used) and melted at 159–162° C. Recrystallization of the product from aqueous acetic acid raised the melting point to 164–165° C.

(c) α-Benzamido-4-(4'-Methoxyphenoxy)-3-Nitrocinnamic Acid

Ten grams (0.024 mole) of the oxazolone prepared as described in section (b) above, was mixed with 200 ml. of a 2% solution of sodium hydroxide in 50% aqueous ethanol and the mixture was heated under reflux for about 5 minutes, whereafter the hot solution was acidified with 20 ml. of 6 N hydrochloric acid followed by chilling. The resulting precipitate was collected on a filter, washed with 50% aqueous ethanol and dried. The resulting product (9.45 g., 90% yield) melted at 229–231° C. and was suitable for use in the next step without further purification. (Recrystallization from ethanol raises the melting point of the product to 231–232° C.)

(d) 4-[3-Iodo-4-(4'-Methoxyphenoxy)Benzal]-2-Phenyl-5 - Oxazolone and α - Benzamido - 3 - Iodo-4-(4'-Methoxyphenoxy)Cinnamic Acid A solution of 4 g. (0.0092 mole) of the product obtained as described in section (c) above, in 200 ml. of acetic acid was hydrogenated in a Parr hydrogenator in the presence of 0.5 g. of palladium on charcoal catalyst. The reaction mixture took up the theoretical volume of hydrogen required to reduce the nitro group to the amino group after hydrogenation had proceeded for about 2 hours. The reaction mixture was then filtered and the filtrate was treated with 90 ml. of water and 10 ml. of concentrated sulfuric acid. The resulting solution was cooled in an ice bath and treated dropwise with stirring, with a 15% aqueous solution of sodium nitrite, until an excess of nitrite could be detected by means of starch iodide paper. The theoretical amount of sodium nitrite was usually required. The resulting solution of the diazonium compound was then added to the rapidly stirred mixture of 80 ml. of water, 80 ml. of chloroform, 0.83 g. of urea, 2.5 g. of iodine and 4.4 g. of sodium iodide cooled in an ice bath. Stirring and cooling were continued for about 15 minutes whereafter the temperature was gradually raised to boiling. The mixture was then allowed to reflux gently for about 30 minutes whereafter the chloroform layer was separated, washed successively with water, 2% aqueous sodium bisulfite and water. The washed solution was dried over magnesium sulfate and evaporated to dryness leaving 4.1 g. (87% yield) of a crude product. This material consisted of a mixture of 4-[3-iodo-4-(4'-methoxyphenoxy)benzal]-2-phenyl-5-oxazolone (M.P. 157° C.) and α-benzamido-3-iodo-4-(4'-methoxyphenoxy)cinnamic acid (M.P. 216° C.), either of which was found to be suitable for conversion to 3-iodothyronine in the next step. Accordingly, the crude mixture obtained above was suitable for use in the next step without purification.

(e) 3-Iodothyronine

To a mixture of 3.8 g. (approximately 0.0076 mole)

of the crude product obtained as described in section (d) above 75 ml. of acetic acid and 1.7 g. of red phosphorus, there was added with stirring, 10.7 ml. of a 1:5 mixture by volume of 57% hydriodic acid and acetic acid. The addition was made dropwise while the reaction mixture was heated under reflux. Refluxing was maintained for 1 hour whereafter 15 ml. of 47% hydrobromic acid was added, and the reaction mixture was refluxed for a further hour. The reaction mixture was then filtered hot and the phosphorus retained on the filter was washed with hot acetic acid. The combined filtrate was cooled to room temperature, neutralized to about a pH 7 with sodium acetate, and then cooled in an ice-water bath. The resulting precipitate was collected on a filter and then dissolved in hot 4 N hydrochloric acid. The solution thus obtained was treated with Norite charcoal, filtered, and the filtrate was cooled. The precipitate formed was collected on a filter and dissolved in 3 N aqueous ammonia. The resulting solution was adjusted to pH 9.5 with acetic acid, whereupon a precipitate was formed which was collected and dried. Recrystallization of this product from 50% aqueous acetic acid gave rise to 1.5 g. (49% yield) of the desired 3-iodothyronine melting at 246–248° C.

Since certain changes may be made without departing from the scope of this invention, it is intended that all matter contained in the above description shall be interpreted as illustrative, and not in a limiting sense.

This application is a division of my co-pending application Serial No. 646,971, filed March 19, 1957, and now Patent No. 2,954,399.

I claim:

In a method of producing 4-(4'-methoxyphenoxy)-3-nitrobenzaldehyde by the condensation of 4-chloro-3-nitrobenzaldehyde with 4-methoxyphenol, the improvement which consists of carrying out said condensation in the presence of potassium hydroxide employing pyridine as the reaction medium and a reaction temperature between about 50° C. and about 65° C.

References Cited in the file of this patent

UNITED STATES PATENTS

| | | |
|---|---|---|
| 545,099 | Schmidt | Aug. 27, 1895 |
| 2,694,731 | Bock et al. | Nov. 16, 1954 |

OTHER REFERENCES

Borrows et al.: Chem. Abstracts, vol. 44 (1950) page 576. (Copy in Library.)